United States Patent
Simpson et al.

(10) Patent No.: US 9,186,605 B2
(45) Date of Patent: Nov. 17, 2015

(54) FILTER PRESS WITH SIDE FEED PORTS

(71) Applicant: DES, Inc., Rio Vista, CA (US)

(72) Inventors: Daniel J. Simpson, Rio Vista, CA (US); Ferdinand Kogler, Rio Vista, CA (US)

(73) Assignee: Daniel J. Simpson, Rio Vista, CA (US)

( * ) Notice: Subject to any disclaimer, the term of this patent is extended or adjusted under 35 U.S.C. 154(b) by 240 days.

(21) Appl. No.: 14/025,686

(22) Filed: Sep. 12, 2013

(65) Prior Publication Data

US 2014/0110355 A1     Apr. 24, 2014

Related U.S. Application Data

(63) Continuation of application No. 12/590,150, filed on Nov. 2, 2009, now Pat. No. 8,535,542.

(60) Provisional application No. 61/197,996, filed on Oct. 31, 2008.

(51) Int. Cl.
| | |
|---|---|
| *B01D 25/32* | (2006.01) |
| *B01D 25/21* | (2006.01) |
| *B01D 25/164* | (2006.01) |
| *B01D 25/28* | (2006.01) |

(52) U.S. Cl.
CPC .......... *B01D 25/322* (2013.01); *B01D 25/164* (2013.01); *B01D 25/284* (2013.01)

(58) Field of Classification Search
CPC ......... B01D 25/12; B01D 25/21; B01D 25/32
USPC ............ 210/774, 769, 770, 649, 650, 748.01, 210/748.07, 766, 780, 179, 180, 184, 224, 210/228, 231, 230, 679; 264/570, 573; 203/11; 585/240; 208/424, 13, 165; 100/37, 38, 137, 138, 193, 194, 195, 100/305, 116
See application file for complete search history.

(56) References Cited

U.S. PATENT DOCUMENTS

| | | |
|---|---|---|
| 3,048,928 A | 8/1962 | Copson et al. |
| 4,108,777 A | 8/1978 | Kurita et al. |

(Continued)

OTHER PUBLICATIONS

International Search Report and Written Opinion Issued Feb. 23, 2010 for International PCT Patent Application Serial No. PCT/US09/05956.

(Continued)

*Primary Examiner* — Walter D Griffin
*Assistant Examiner* — Cameron J Allen
(74) *Attorney, Agent, or Firm* — David H. Jaffer; Pillsbury Winthrop Shaw Pittman LLP

(57) ABSTRACT

A method of separating a mixture of liquid and insoluble solids in a filter press may comprise: pumping the mixture into a multiplicity of chambers to form a filter cake, each of the chambers being between adjacent filter plates, each of the chambers being lined by filter cloths, wherein, during the pumping, filtrate is forced through the filter cloths and out of the chambers; and releasing dried filter cake from the chambers; wherein the pumping comprises pumping the mixture through a multiplicity of side feed ports and into each of the chambers through a multiplicity of delivery slots, and wherein the openings of the delivery slots into each of the chambers is above the height of the side feed ports. A filter press system is described which includes filter plates and chambers with the aforementioned configuration of side feed ports and delivery slots.

13 Claims, 12 Drawing Sheets

(56) References Cited

U.S. PATENT DOCUMENTS

| | | |
|---|---|---|
| 4,544,490 A | 10/1985 | Erickson et al. |
| 4,617,863 A | 10/1986 | Kenyon |
| 4,740,413 A | 4/1988 | Wildner |
| 4,839,045 A | 6/1989 | Wildner |
| 4,995,972 A | 2/1991 | Kramer et al. |
| 5,672,272 A | 9/1997 | Baer |
| 6,149,806 A | 11/2000 | Baer |
| 6,180,002 B1 | 1/2001 | Higgins |
| 6,280,638 B1 | 8/2001 | Belchev |
| D452,295 S | 12/2001 | Ricketts |
| 6,689,925 B2 * | 2/2004 | Malhis ......................... 585/240 |
| 7,309,408 B2 | 12/2007 | Benavides |
| 7,422,680 B2 | 9/2008 | Sheets, Sr. |
| 2001/0021428 A1 | 9/2001 | Simpson et al. |
| 2004/0084380 A1 | 5/2004 | Kicinski |
| 2004/0149649 A1 | 8/2004 | Uchiyama |
| 2006/0032805 A1 | 2/2006 | Hildebrant et al. |
| 2006/0131224 A1 | 6/2006 | Hibble |
| 2007/0084781 A1 | 4/2007 | Hornback et al. |
| 2007/0125693 A1 | 6/2007 | Lindley |
| 2008/0082093 A1 | 4/2008 | Prakash et al. |
| 2008/0190831 A1 * | 8/2008 | Marchek ........................ 210/231 |

OTHER PUBLICATIONS

*Macrowave™ RF Filter Press Cake Drying System*, see: http://www.radiofrequency.com/products/filterpress.html last viewed May 21, 2010.

International Search Report and Written Opinion issued for PCT/US2011/24341 on Apr. 12, 2011.

International Search Report and Written Opinion issued for PCT/US2011/23310 on Mar. 23, 2011.

* cited by examiner

Process Flow for Separation of Mixture of Liquid and Insoluble Solids in a Filter Press

SECTION X-X

SECTION N-N

SECTION Y-Y

SECTION Z-Z

FILTER PRESS WITH SIDE FEED PORTS

CROSS-REFERENCE TO RELATED APPLICATIONS

This application is a continuation of U.S. application Ser. No. 12/590,150 filed Nov. 2, 2009, now U.S. Pat. No. 8,535,542 issued Sep. 17, 2013, which claims the benefit of U.S. Provisional Application Ser. No. 61/197,996 filed Oct. 31, 2008, both incorporated by reference in their entirety herein.

FIELD OF THE INVENTION

The invention relates to a filter-press and more specifically to a filter-press with integrated microwave/radio frequency heating and vacuum drying.

BACKGROUND OF THE INVENTION

Filter presses are used for dewatering/drying materials such as slurries. Part of the process may involve heating the material held in the filter press in chambers between the filter plates while apply a vacuum to remove water vapor and other volatile substances. Currently, heating of the material is accomplished by heat transfer through filter plates, from steam channels within the filter plates. The filter plates are made of plastic, which limits the temperature of the steam to ensure that the filter plates do not soften too much. There is a need for more efficient ways of heating the material held between the filter plates. There is a need to increase the temperature of the material held between the plates, or to deposit more energy per unit volume within the material, so as to increase the throughput of a filter press, without jeopardizing the integrity of the filter plates.

Radio frequency heating is used to dry a wide range of products including food products, ceramic powders and filter cakes. Radio frequency heating, also referred to as dielectric heating, occurs due to dielectric losses in a material exposed to a changing electric field. An apparatus for dielectric heating at lower frequencies may include parallel metal plates with a changing potential difference applied at a frequency somewhere in the range of 1 to 100 megahertz; particular frequencies that have been set aside by the United States FCC for dielectric heating are 13.56, 27.12 and 40.68 MHz. Material is placed or moved between the parallel plates in order to be heated. Microwave heating of materials is a sub-category of dielectric heating within a frequency range of 300 to 3000 MHz. As a reference point, conventional microwave ovens generally operate at 2.45 GHz. Microwave sources are well known in the prior art. When using dielectric heating, metal objects or components within the irradiated volume may be undesirable, particularly when the metal causes reflection of the radio frequency energy and/or damaging electrical discharges.

The present invention provides a breakthrough by integrating radio frequency heating directly into a filter press.

SUMMARY OF THE INVENTION

This invention is the integration of radio frequency heating into a filter press system to assist in the separation of liquids and insoluble solids for a wide range of mixtures including slurries, sludges, tailings, oil deposits, food products, pharmaceuticals, etc. The separation of liquids and insoluble solids includes dewatering/drying. The separated liquid and solids are generally referred to as filtrate and filter cake, respectively.

Radio frequency heating provides a potentially very efficient method of directly heating the filter cake within the filter press. This may be achieved by choosing a radio frequency for which the filter cake has strong absorption of the radio frequency energy and fabricating the filter press out of materials with weak radio frequency absorption at the chosen frequency. Direct heating of the filter cake also has the advantage of removing the need for indirect heating. (Indirect heating of the filter cake by passing steam through the filter plates can result in thermal problems for plastic filter plates, such as softening.) For example, for dewatering, there are frequencies for which water is strongly absorbing and for which plastics materials/polymers, out of which filter plates may be made, are weakly absorbing.

According to aspects of the invention, a method of separating a mixture of liquid and insoluble solids in a filter press comprises: pumping said mixture into a chamber between two filter plates in the filter press to form a filter cake, wherein the chamber is lined by filter cloths, and wherein, during the pumping, filtrate is forced through the filter cloths and out of the chamber; heating the filter cake in the chamber, wherein, during the heating, filtrate is forced through the filter cloths and out of the chamber; and releasing dried filter cake from the chamber; wherein the heating is by radio frequency irradiation of the filter cake in the chamber.

The radio frequency heating may include microwave heating. The microwave heating may be by at least one microwave antenna embedded in at least one of the filter plates. The microwave antenna may be a monopole, a dipole, a wave guide, a linear structure, a helical structure, etc. A filter press contains a multiplicity of filter plates. The antennas may be configured in the filter plate(s) to optimize the heating of the filter cake in the chambers between the filter plates. The antennas may be embedded in every Pth filter plate in the filter press, where P is an integer greater than or equal to 2, or greater than or equal to 10, for example. Alternatively, the filter plates may be configured with an aperture in the center, the microwave heating may be by at least one microwave antenna positioned in the apertures through the middle of the filter plates, and the microwave antenna is removable from the aperture allowing for the filter plates to be removed from the filter press. In another alternative, microwave heating may be by microwave horns positioned externally, but in close proximity to, the filter press.

Furthermore, the radio frequency heating may include dielectric heating by lower frequency radio waves in the range of 1 to 100 MHz, and the radio frequency irradiation is applied by a system including parallel electrode plates configured (1) with the planes of the parallel electrode plates roughly orthogonally to the planes of each of the plurality of filter plates, (2) in close proximity to the outer surface of the plurality of filter plates, and (3) on either side of the plurality of filter plates.

In general, microwave frequencies may be well suited for small filter presses and the lower frequencies may be well suited for large filter presses. This is due to the lower frequencies being more penetrating within the filter press. In general, small filter presses are used for high value products such as foodstuffs and pharmaceuticals, for example, and large filter presses are used for high volume processes. The use of radio frequency has a further advantage in that it is effective in destroying biological growths, pathogens and viruses.

The structural components of the filter press, such as the frame, may be non-metallic. The filter plates may be surrounded by a radio frequency screening material, so as to reduce radio frequency radiation outside of the filter press.

According to further aspects of the invention, a filter press system for separating a mixture of liquid and insoluble solids comprises: a frame; a plurality of filter plates configured to form a stack of parallel plates, each of the plurality of filter plates being movably attached to the frame, the plurality of filter plates further being configured to form a multiplicity of chambers, each of the multiplicity of chambers being formed by adjacent filter plates of the plurality of filter plates, each of the multiplicity of chambers being lined by filter cloths, wherein the plurality of filter plates, the multiplicity of chambers and the filter cloths are configured to allow filtrate to escape from the chambers while retaining solids from the mixture to form a filter cake; and a radio frequency heater, for directly heating the filter cake in the multiplicity of chambers. Furthermore, the radio frequency heater may comprise parallel electrode plates attached to the frame and electrically coupled to a radio frequency generator, the parallel electrode plates being configured with the planes of the parallel electrode plates roughly orthogonally to the planes of each of the plurality of filter plates, and in close proximity to the outer surface and on either side of the plurality of filter plates.

According to further aspects of the invention, a filter press comprises: a multiplicity of filter plates formed of a plastics material/polymer, each of the filter plates having a flange on a first side and a flat surface on the second side, the flange having a rectangular cross-section, whereby, when the flange of a first plate is brought into contact with the flat surface of an adjacent second plate and pressure is applied, a seal is formed between the first and second plates.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
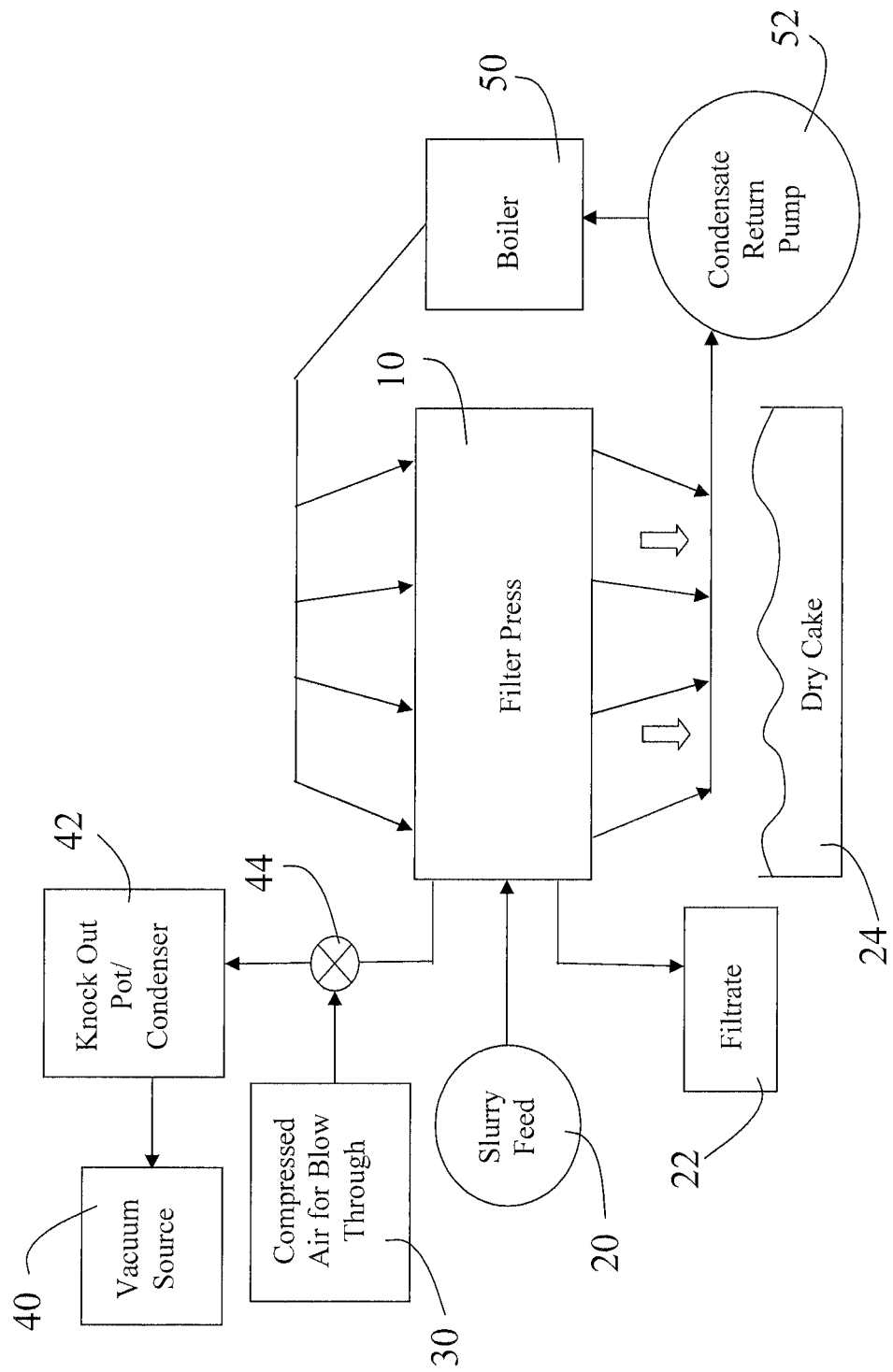
FIG. 1 is a schematic of a filter press system.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

This invention is the integration of radio frequency heating into a filter press system to assist in the separation of liquids and insoluble solids for a wide range of mixtures including slurries, sludges, tailings, oil deposits, food products, pharmaceuticals, etc. The separation of liquids and insoluble solids includes dewatering/drying. The separated liquid and solids are generally referred to as filtrate and filter cake, respectively. The invention may include incorporating radio frequency heating into filter presses, including the filter presses described herein and similar filter press machines. Furthermore, radio frequency heating may be incorporated in other filter presses according to the teaching and principles of the present invention.

Radio frequency heating, also referred to as dielectric heating, occurs due to dielectric losses in a material exposed to a changing electric field. An apparatus for dielectric heating at lower frequencies may include parallel metal plates with a changing potential difference applied at a frequency somewhere in the range of 1 to 100 megahertz; particular frequencies that have been set aside by the United States FCC for dielectric heating are 13.56, 27.12 and 40.68 MHz. Material is placed or moved between the parallel plates in order to be heated. Microwave heating of materials is a sub-category of dielectric heating within a frequency range of approximately 300 to 3000 MHz. A variety of radio frequency sources and apparatuses are described herein. However, other radio frequency sources and apparatuses operating within the frequency range from 1 MHz to 3 GHz may be used according to the principles and teaching of the present invention.

Radio frequency heating provides a potentially very efficient method of directly heating the filter cake within the filter press. This may be achieved by choosing a radio frequency for which the filter cake has strong absorption of the radio frequency energy and fabricating the filter press out of materials with weak radio frequency absorption at the chosen frequency. Direct heating of the filter cake also has the advantage of removing the need for indirect heating. (Indirect heating of the filter cake by passing steam through the filter plates can result in thermal problems for plastic filter plates such as softening.) For example, for dewatering, there are frequencies for which water is strongly absorbing and for which plastics materials/polymers, out of which filter plates may be made, is weakly absorbing.

FIG. 1 shows a schematic of a filter press system which is representative of those manufactured and installed worldwide by DES, Inc., DryVac Canada, Ltd. and affiliated companies. FIG. 1 shows a filter press 10 for processing a slurry 20 to produce a filtrate 22 and a dry filter cake 24. The dry filter cake is released from the filter press as indicated by the large arrows, as described in more detail below, and is collected in a tray, on a conveyor belt below the filter press, or in any other removal device. In this example, a slurry is described as being fed into the filter press for separation, however, a wide range of mixtures of liquid and insoluble solids may be separated using this system. The filter press system includes: an air compressor 30 for forcing air through the cake in the filter press to remove filtrate; a vacuum source 40 connected to a knock out pot/condenser 42 and then to the filter press 10 through a valve 44; and a boiler 50 for generating steam connected in a closed circuit to the filter press 10 and a condensate return pump 52—the direction of flow for the steam into the filter press and the condensate out of the filter press is indicated by the arrows. The vacuum source 40 is used to apply a vacuum to the filter cake in the filter press to remove filtrate (as either a liquid or a vapor). Note that the valve 44 is used to isolate either or both the air compressor 30 and/or the vacuum source 40 depending on what is required in a particular processing step in the filter press. The knock out pot part of 42 is basically a low velocity flow part of the vacuum line where filtrate may be collected; the condenser part of 42 condenses any filtrate present in vapor form. The boiler 50 produces steam, at approximately 15 psi, for heating the filter press 10 and/or inflating envelopes in the filter plates in the filter press, as described in more detail below.

Figure 2:
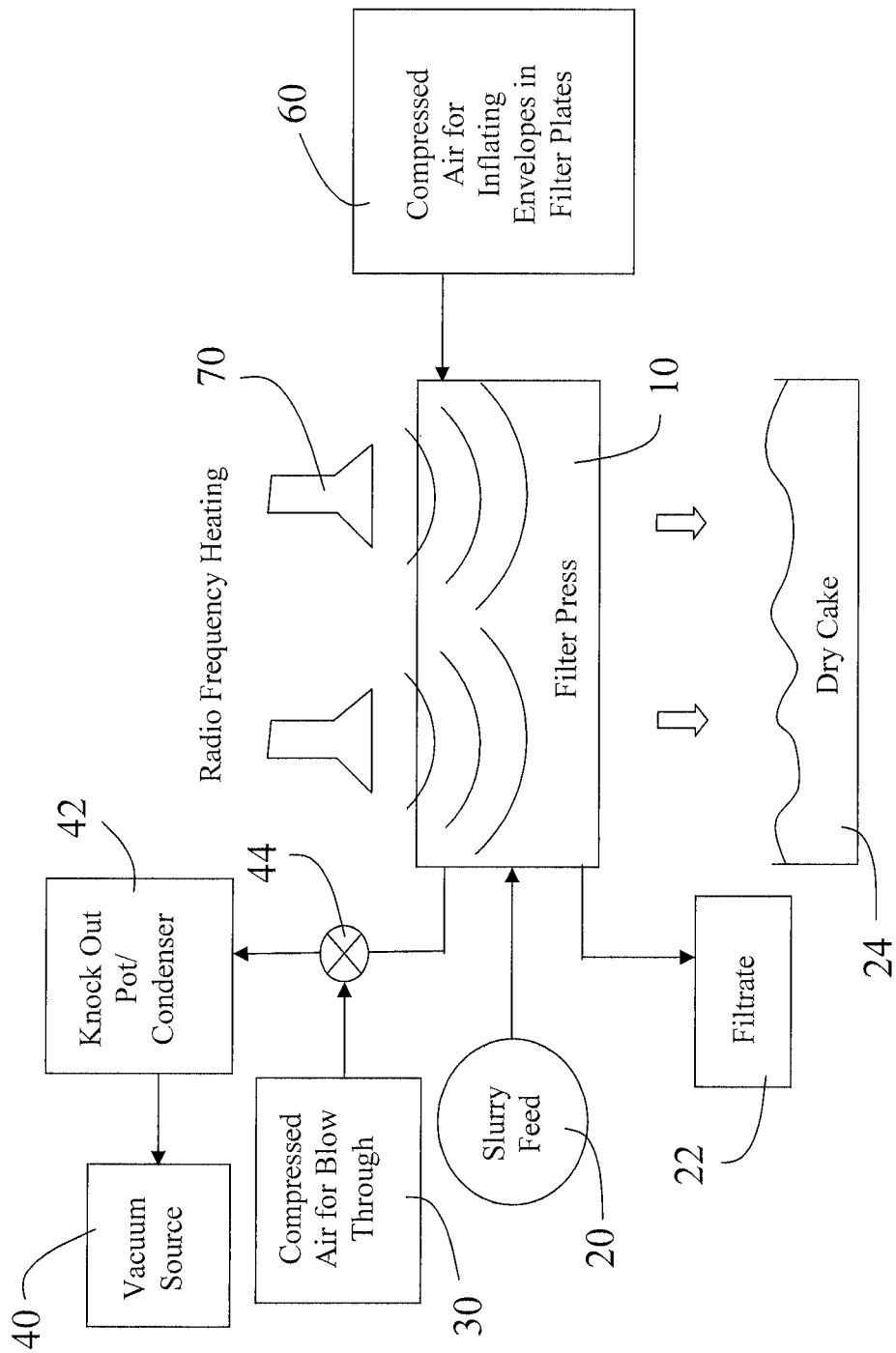
FIG. 2 is a schematic of a filter press system including radio frequency heating, according to aspects of the present invention.

FIG. 2 shows a schematic of a filter press system including radio frequency heating, according to some embodiments of the present invention. FIG. 2 shows an example of the radio frequency heating—radio frequency sources 70, such as microwave sources, generate radio waves shown propagating into the filter press 10 where the filter cake absorbs some of the radio frequency energy and heats up. Other than the radio frequency heating, the system of FIG. 2 operates very similarly to the system of FIG. 1. Comparing FIGS. 1 & 2, it is seen that in FIG. 2 the steam supply has been replaced by an air compressor 60. Heating using radio frequency may be more efficient than using steam, and therefore removes the need for steam. However steam may be used in combination with radio frequency heating, if desired. Regarding inflation of the envelopes in the filter plates, compressed air alone may be used.

As is well known in the art, filter presses include a stack of filter plates, the filter plates are covered by filter cloths, and each pair of filter plates defines a chamber lined with filter cloths into which slurry or other material is fed for dewatering or similar processing. Generally, there will be a stack of N filter plates in a filter press, and M chambers between the plates, where M=N−1 and M and N are integers. Details of filter plates which are representative of those manufactured and installed worldwide by DES, Inc., DryVac Canada, Ltd. and affiliated companies are provided below and in FIGS. 5-13. Filter plates are also described in U.S. Pat. Nos. 5,672,272 and 6,149,806 to William Baer, incorporated by reference in their entirety herein.

Figure 3A:
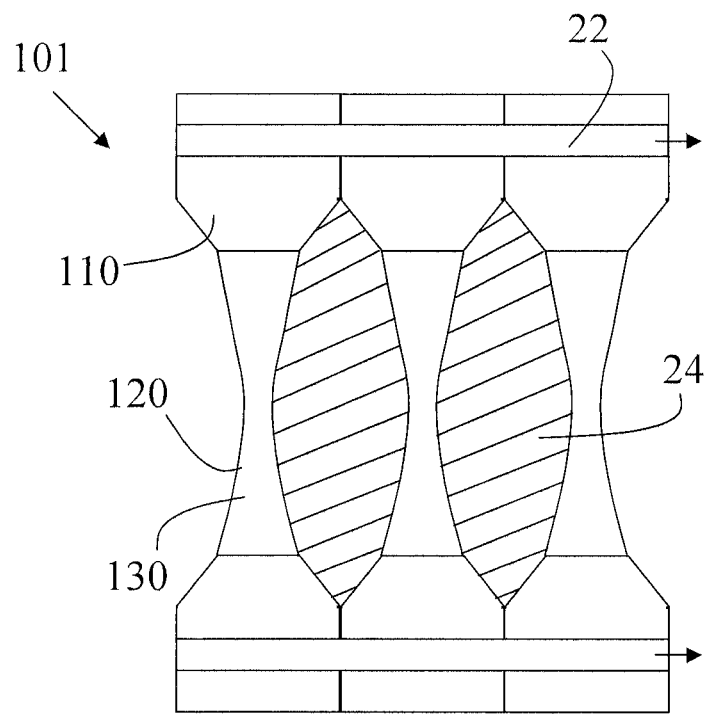
FIGS. 3A-3D are a representation of a process for separating a mixture of liquid and insoluble solids using a filter press, according to some embodiments of the present invention.
Figure 3B:
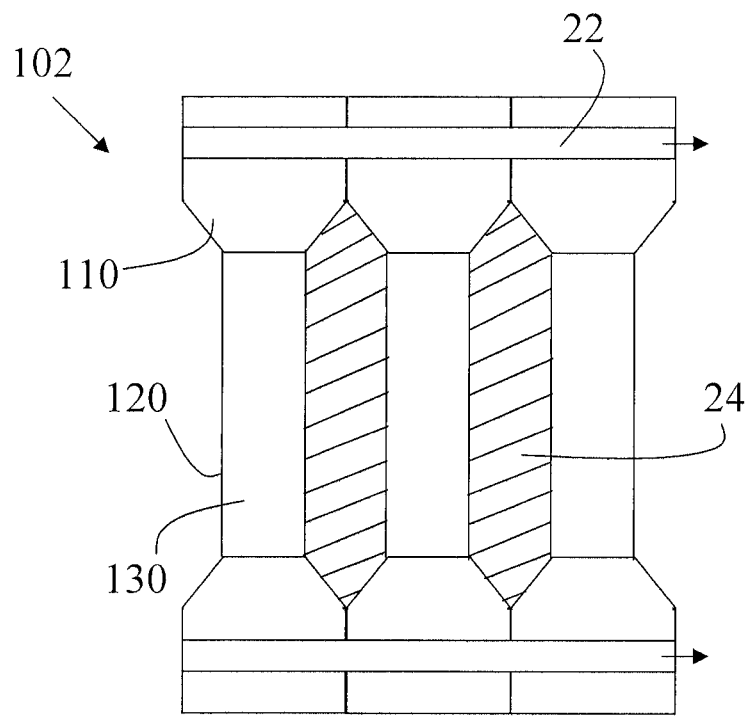
Figure 3C:
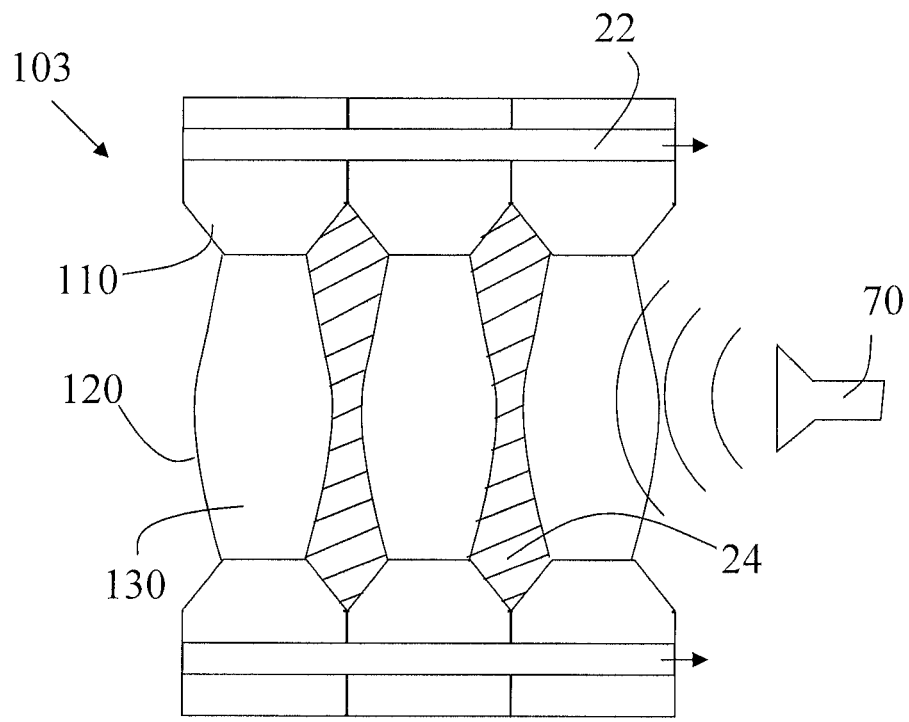
Figure 3D:
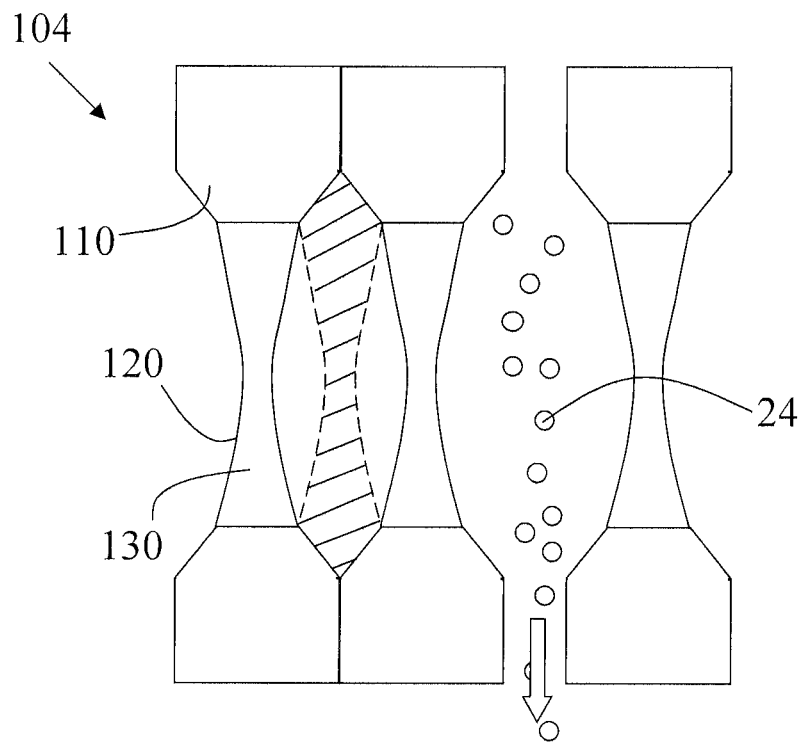
Figure 4:
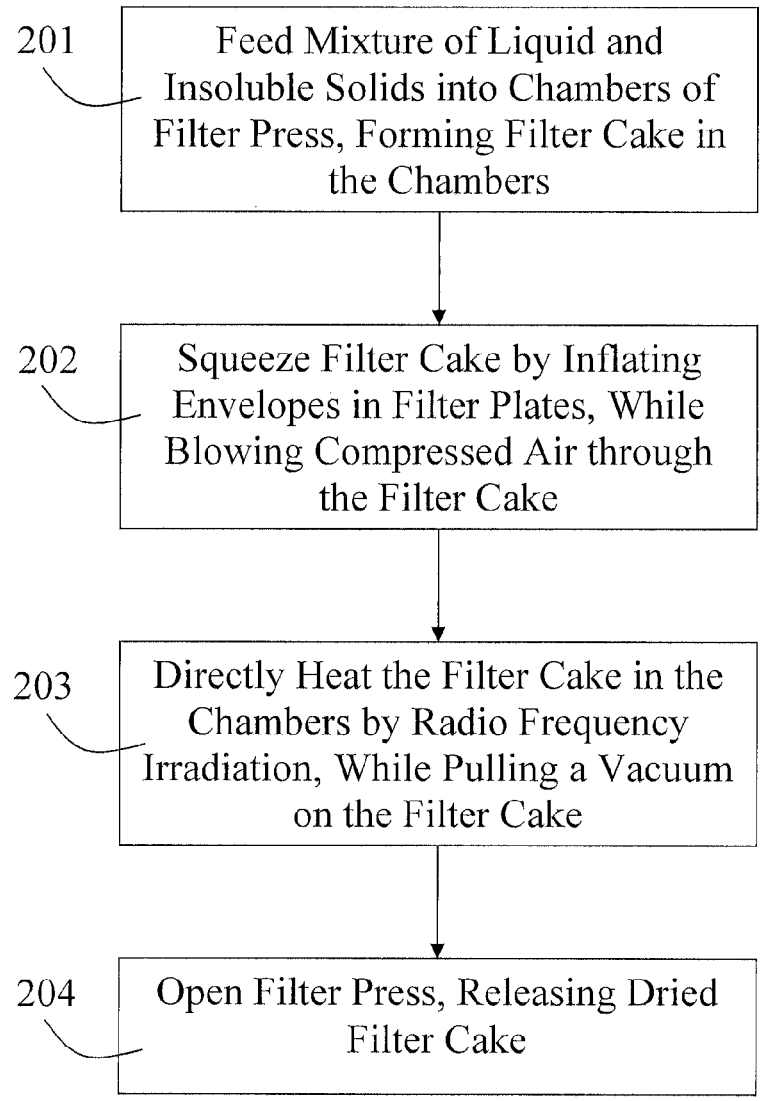
FIG. 4 is a process flow for separating a mixture of liquid and insoluble solids using a filter press, according to some embodiments of the present invention.

The schematic illustrations of FIGS. 3A-3D and the process flow of FIG. 4 are used together to describe a method of separating a mixture of liquid and insoluble solids using a filter press system, such as the filter press system shown in FIG. 2, according to some embodiments of the present invention. The illustrations in FIGS. 3A-3D show a cross-sectional view of a block of three adjacent filter plates in the filter press for four different process steps. Each of the filter plates is shown to comprise a frame 110 around the periphery of the plate, a diaphragm 120 in the center of the plate, the diaphragm containing a hollow envelope 130 which can be inflated or deflated in order to squeeze the filter cake 24 which sits in chambers between the filter plates. Filtrate 22 is removed from the filter press through ducts as shown.

Step 201 includes feeding a mixture of liquid and insoluble solids into the chambers of a filter press, forming a filter cake in the chambers. As the mixture is forced into the chambers, some of the filtrate is lost through filter cloth which lines the chambers and leaves the filter press through ducts in the filter plates. This is shown in FIG. 3A—note that the envelopes 130 are not inflated at this point in the process. Step 202 includes squeezing the filter cake by inflating the envelopes in the filter plates, while blowing compressed air through the filter cake. Both the squeezing and blowing act to remove filtrate from the filter cake and act together efficiently, although the squeezing and blowing may be used separately or just one of the squeezing or blowing may be used. FIG. 3B shows the envelopes 130 partially inflated, by compressed air, for squeezing the filter cake 24 in the chambers. Step 203 includes directly heating the filter cake in the chambers by radio frequency irradiation, while pulling a vacuum on the filter cake. The envelopes are still inflated by compressed air. FIG. 3C shows radio frequency heating by radio frequency irradiation from a radio frequency source 70, such as a microwave source. The combination of pulling a vacuum on the filter cake 24 in the chambers and the inflation of the envelopes 130 by compressed air squeezes more filtrate 22 out of the filter cake 24 and reduces the volume of the chambers. Note that the filtrate may be removed from the filter cake as a vapor or a liquid, depending on the physical properties of the filtrate and the environmental conditions in the chamber—specifically temperature and pressure. Step 204 includes opening the filter press and releasing the dried filter cake. At this point in the process the radio frequency heating has been stopped, the vacuum is no longer applied to the filter cake and the envelopes 130 have been deflated. As shown in FIG. 3D, the filter plates are separated to allow the dried filter cake 24 to fall out of the chambers, as shown, and to be collected.

Figure 5:
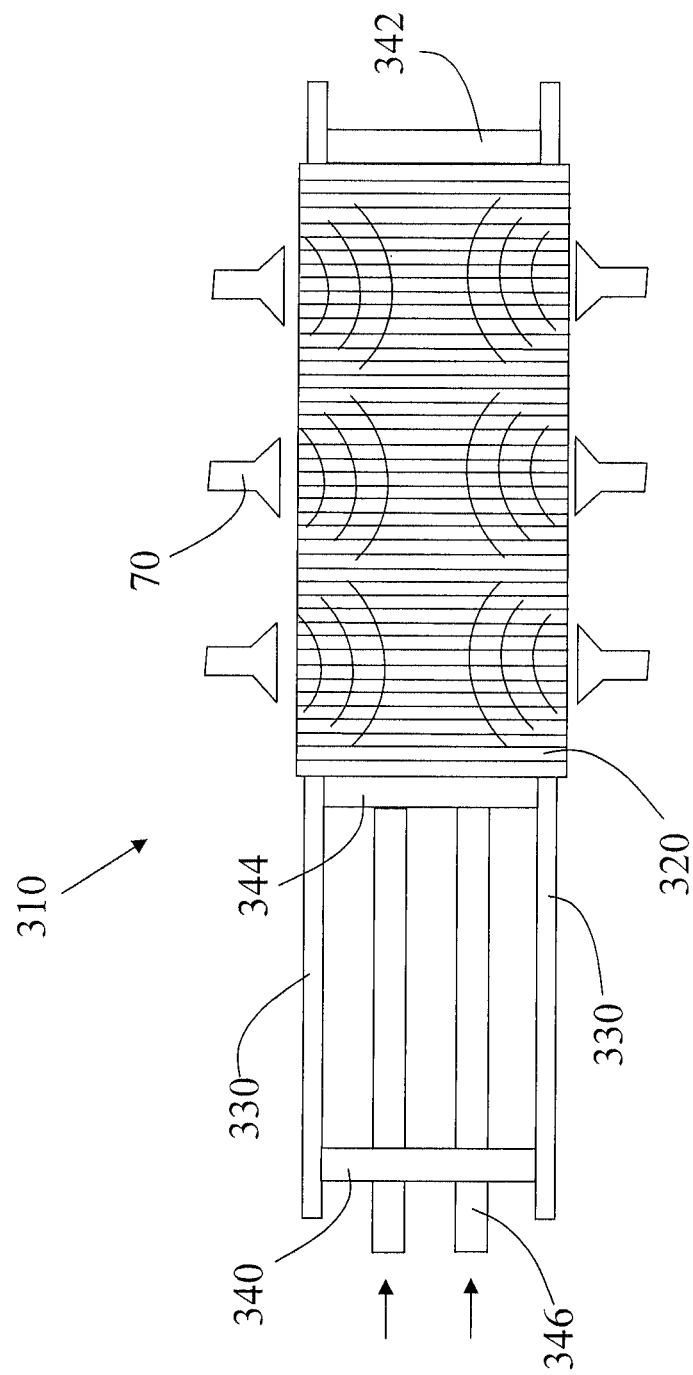
FIG. 5 is a top view representation of a filter press with integrated microwave heating using microwave horns, according to some embodiments of the present invention.

FIG. 5 shows a top view of a filter press 310 with integrated microwave heating using microwave horns 70, according to some embodiments of the present invention. The filter press 310 includes a stack of filter plates 320 mounted in a press comprising frame rails 330, on which the filter plates hang, fixed end plates 340 and 342, a movable plate 344, and rods 346 for applying a compressive force to the movable plate 344 as shown. Application of a compressive force to the movable plate 344 results in compressing the stack of filter plates 320. The microwave horns 70 are shown propagating radio waves into the filter press where the filter cake in the chambers absorbs the radio frequency energy and heats up. The microwave horns are arranged around the outside of the stack of filter plates so as to provide relatively uniform heating of the filter cake within. Six microwave horns 70 are shown in the figure, but more or less may be used and arranged differently to achieve uniform heating of the filter cake in the chambers.

Figure 6:
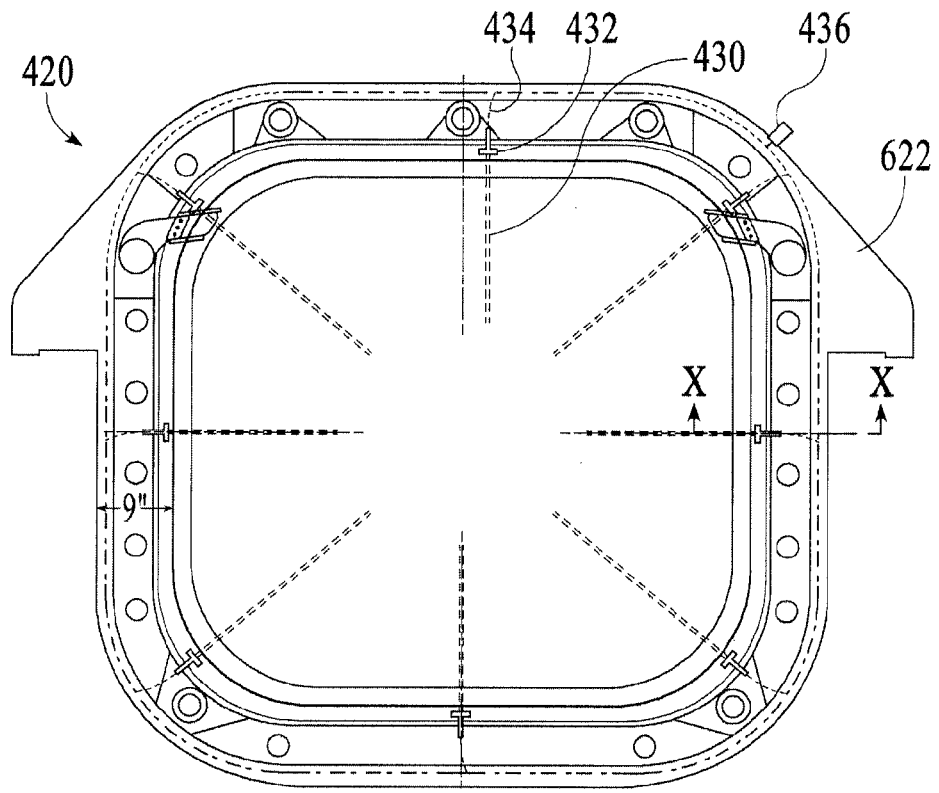
FIG. 6 is a plan view of a filter plate with microwave antennas, according to some embodiments of the present invention.
Figure 7:
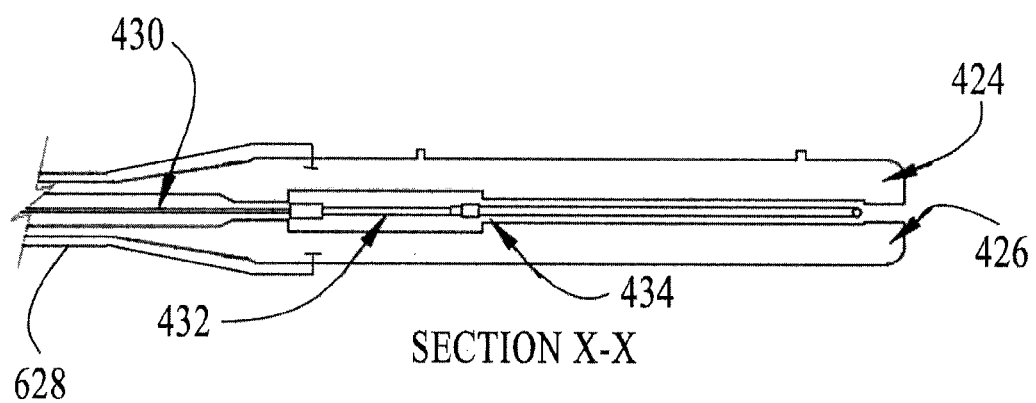
FIG. 7 is a cross-section of the filter plate of FIG. 6, showing part of one antenna, transducer and cable, according to some embodiments of the present invention.

FIGS. 6 & 7 show plan view and cross-sectional views of a filter plate 420 with microwave antennae embedded within. Eight microwave antennae 430 are attached to a transducer 432 each, and the transducers are attached to a power supply by coaxial cable 434 via a connector 436 on the outside of the filter plate. The microwave antennae 430 and related components are all embedded within the plate, but their positions within the plate are indicated in the plan view of FIG. 6 (with dashed lines). FIG. 7 shows the position of the microwave antennae 430 within the filter plate 420, between upper 424 and lower 426 parts of the plate 420. FIG. 7 is shown with the upper 424 and lower 426 parts of the plate separated, for ease of illustration; however, the upper 424 and lower 426 parts are attached, flush to each other, to make the filter plate 420. Since the microwave antennas 430 are embedded within the plate, which is made of a plastic material, they are therefore isolated from the filter cake and filtrate within the filter press. Filter plates 420 containing microwave antennas 430 may be included perhaps every other plate in the stack of filter plates in the press, perhaps every $10^{th}$ plate in the stack—to generalize, every $P^{th}$ plate in the stack where P is an integer greater than 1. The number of filter plates 420 with microwave antennas 430 and the configuration of the microwave antennas will be optimized to heat the filter cake contained within the chambers between adjacent plates. Furthermore, the number of microwave antennas 430 will be governed by the size of the chambers and the power rating of the transducers.

Figure 11:
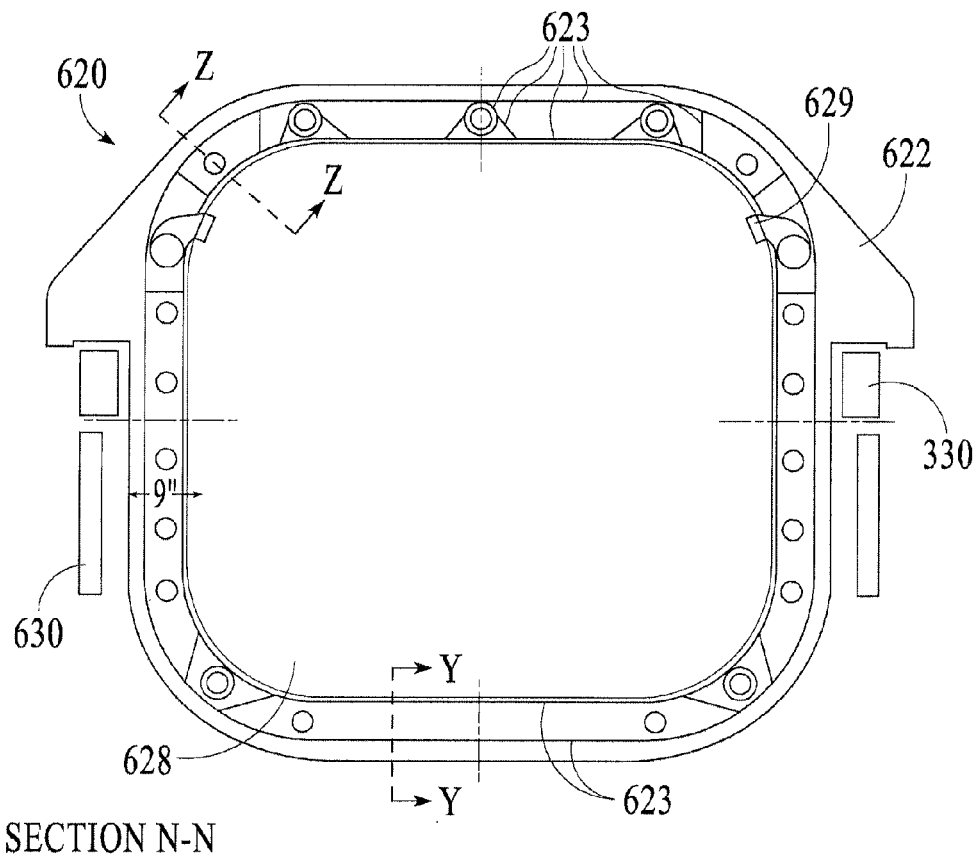
FIG. 11 shows a cross section through the filter press shown in FIG. 11, showing the position of the parallel plate electrodes, according to some embodiments of the present invention.
Figure 13:
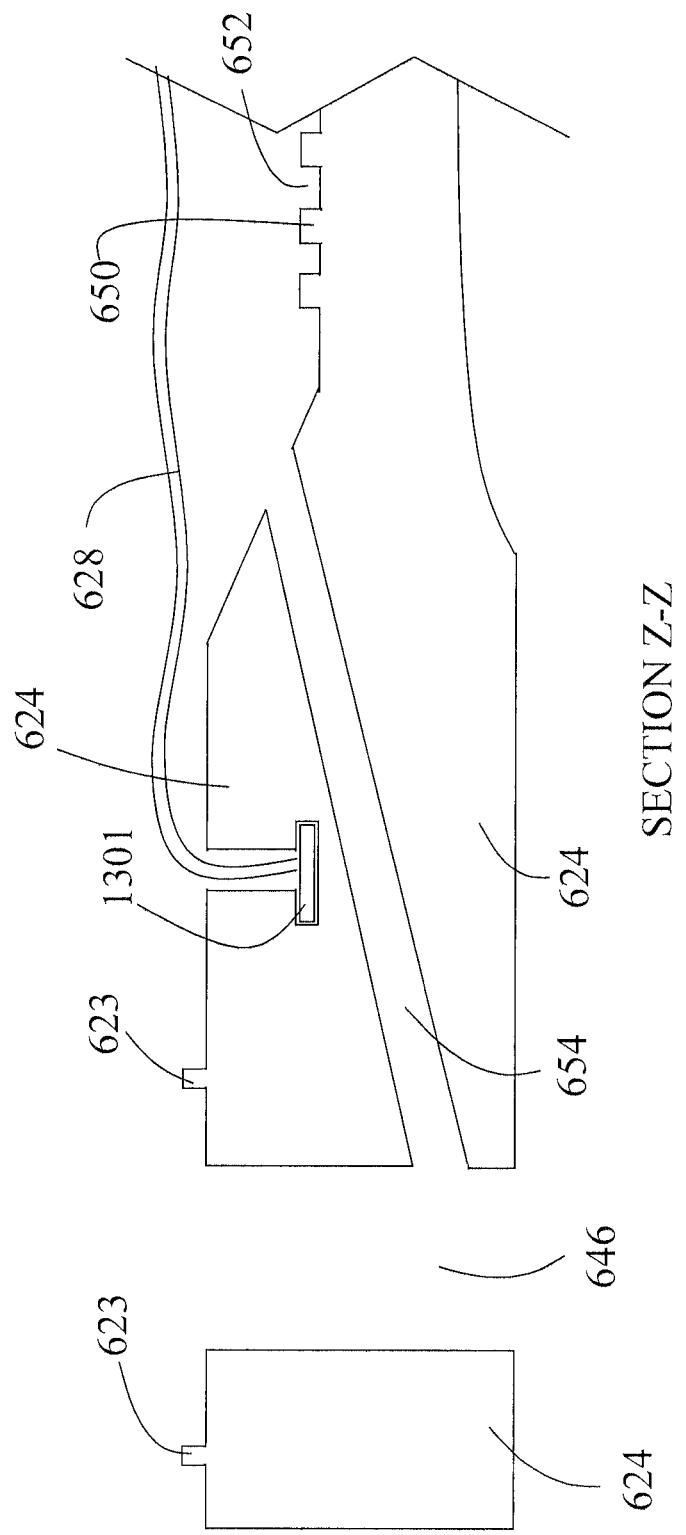
FIG. 13 shows a cross section through the plate of FIG. 11, showing drainage holes and the retention of the filter cloth, according to some embodiments of the present invention.

FIG. 6 also shows the handles 622 which are used to place the filter plate 420 on frame rails 330 and may also be used to move the plates along the frame rails. (See FIG. 11 for a good illustration of a filter plate positioned on a frame rail 330.) Filter cloths 628 are shown on both sides of the filter plate 420 in the cross-section of FIG. 7. The filter cloth 628 actually covers the interior area of the filter plate 420; however the filter cloth is not shown in FIG. 6 in order to more clearly show other features. (FIG. 11 shows the position of the filter cloth 628 in the central area of the filter plate and FIG. 13 shows in more detail how the filter cloth is attached to the filter plate.)

Figure 8:
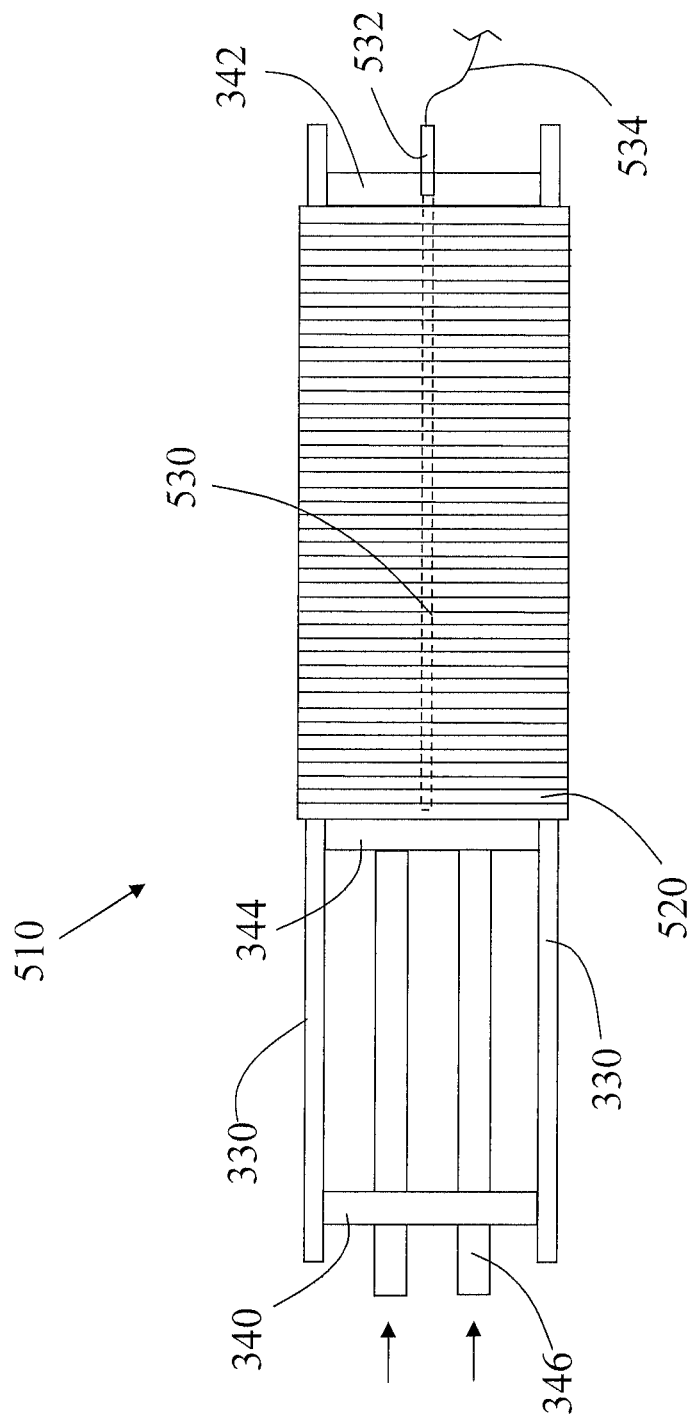
FIG. 8 is a top view representation of a stack of filter plates in a filter press with a microwave antenna through the center of all of the plates, according to some embodiments of the present invention.
Figure 9:
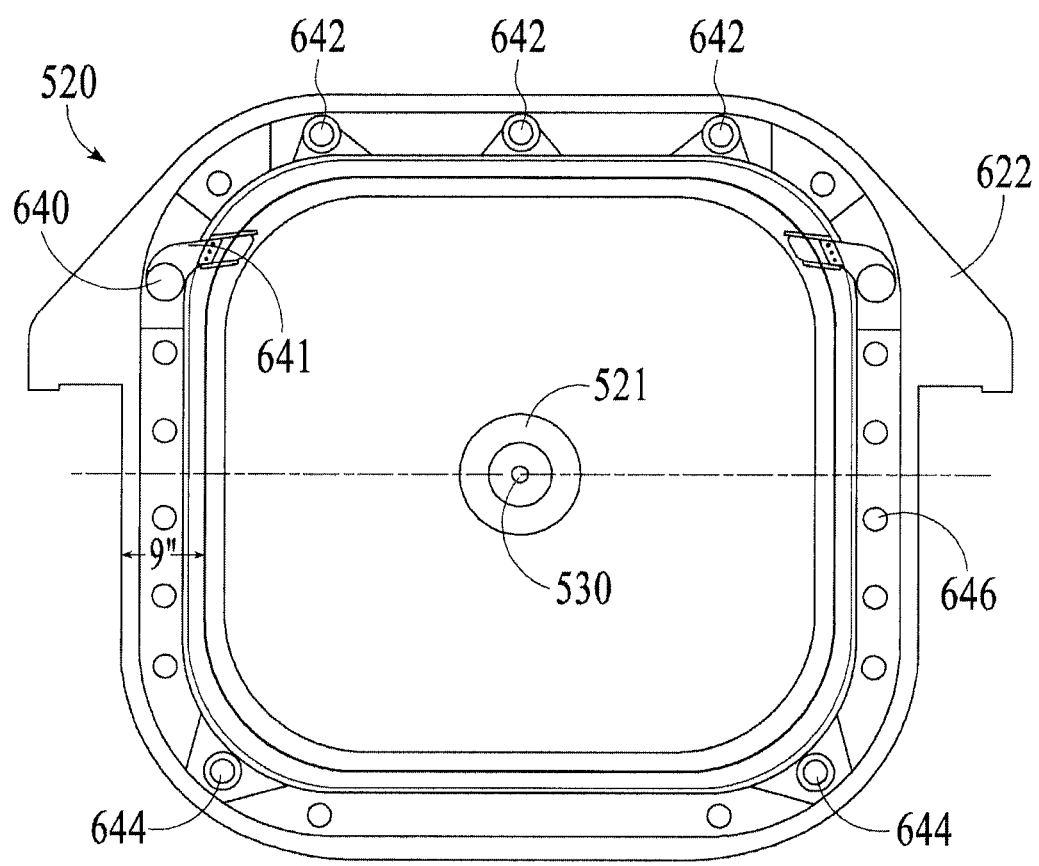
FIG. 9 shows a single filter plate from the stack shown in FIG. 8, showing the position of the microwave antenna, according to some embodiments of the present invention.

FIG. 8 shows a top view of a filter press 510 with integrated microwave heating using an antenna 530 positioned centrally within the stack of filter plates, according to some embodiments of the present invention. The filter press 510 includes a stack of filter plates 520 with a microwave antenna 530 positioned centrally with the stack. The position of the microwave antenna 530 within the stack is indicated in the top view of FIG. 8 (with dashed lines). The microwave antenna 530 is attached to a transducer 532 and a coaxial cable 534, which is connected to a power supply. FIG. 9 shows the filter plate 520 with the centrally placed microwave antennae 530. A sealing flange 521 is required in the center of the filter plate 520 to accommodate the microwave antennae 530. Similar sealing flanges are described in detail in U.S. Pat. No. 6,149,806 to William Baer, incorporated by reference in its entirety herein. However, in the present invention, instead of having a central feed, the sealing flange 521 must provide a vacuum tight seal to isolate the central volume in which the microwave antenna 530 is placed. The microwave antenna 530 may be inserted in a tube which runs through the center of the stack of filter plates in the filter press. The microwave antenna 530 (and its tube, if used) most be removable from the stack so as to permit removal of individual filter plates.

Combinations of microwave antennas/sources such as those shown in FIGS. 5-9 are also envisaged. Furthermore, microwave sources are not limited to those disclosed above, but may include microwave antennas such as monopoles, dipoles, wave guides, linear structures, helical structures, etc.

FIG. 9 also shows the receiving ports and the filtrate ports which are situated around the periphery of the filter plate 520. These ports are apertures which extend completely through the filter plate and connect with the corresponding ports on the neighboring filter plates in the stack. The mixture of liquid and insoluble solids, such as slurry, is delivered through feed ports 640. The example shown in FIG. 9 is referred to as a side feed port. The configuration of the ports may be changed to provide top delivery, if desired. Delivery slots 641 are machined into the filter plate to allow the mixture to get from the feed port into the filter cloth lined chamber formed between adjacent filter plates. Steam ports 642 are for delivering steam into the envelope in the middle of the filter plate, and condensate ports 644 are for draining condensate from the envelope. (The envelope 130/660 is shown in FIGS. 3A-3D and 12.) Alternatively, ports 642 and 644 may be used for inflating/deflating the envelope using compressed air—when steam is not being used. Ports 646, which include all of the unlabeled ports around the periphery of the filter plate, are used to connect to either compressed air during the blowing of air through the filter cake, or to vacuum when the filter cake is being heated. (See FIGS. 2 and 4.)

Figure 10:
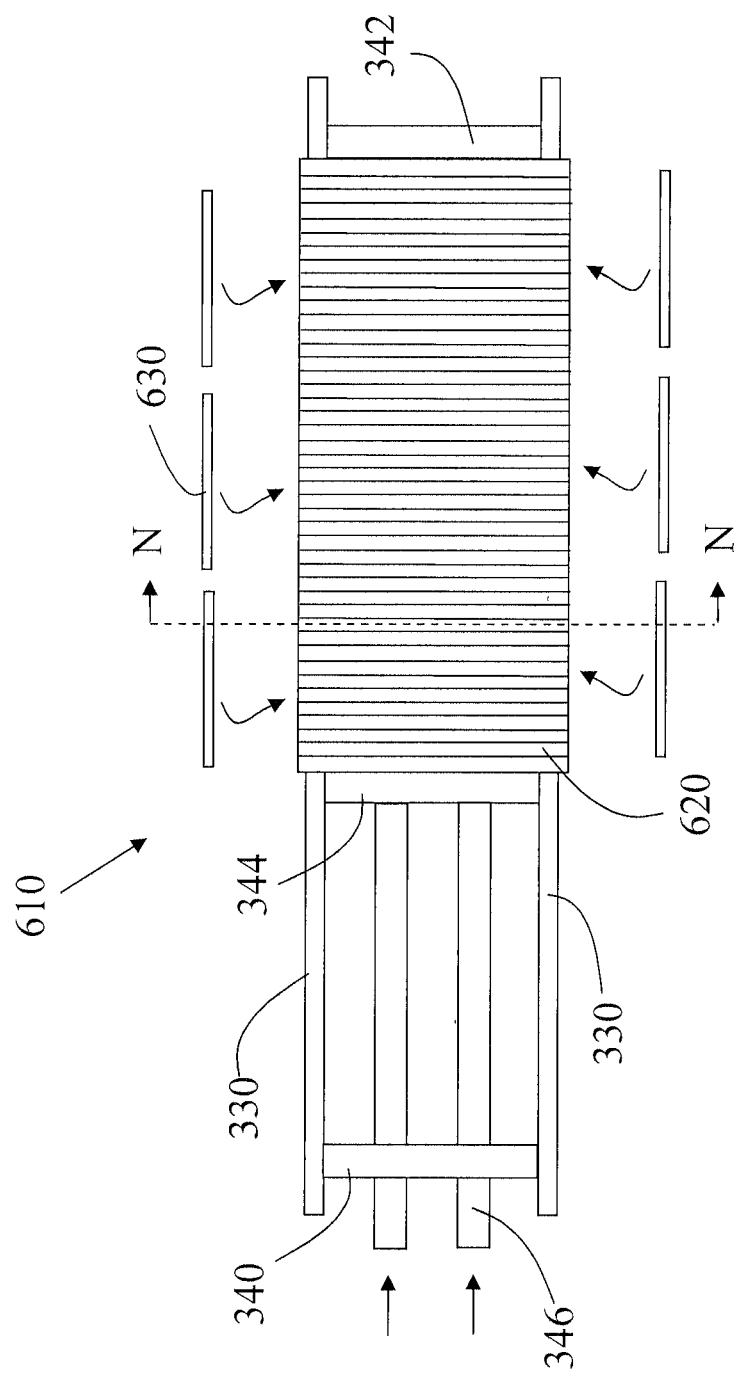
FIG. 10 shows a filter press with integrated radio frequency heating using parallel plate electrodes, according to some embodiments of the present invention.

FIG. 10 shows a top view of a filter press 610 with integrated radio frequency heating using parallel plate electrodes 630, according to some embodiments of the present invention. The filter press 610 includes a stack of filter plates 620 and pairs of parallel plate electrodes 630 positioned outside the stack. The position of the electrodes 630 is indicated by the arrows—the electrodes 630 are actually positioned under the frame rails 330, which is more clearly shown in FIG. 11. Each pair of electrodes 630 may be connected to its own radio frequency generator or a single radio frequency generator may be used for multiple pairs. The number of pairs of electrodes may be varied depending on factors such as the size of the filter press, materials limitations for the electrodes, load limitations of radio frequency generators, etc. Furthermore, in some embodiments it is envisaged that a single pair of plates 630 may be sufficient for a filter press. The placement of the electrodes 630 is determined by the desire to provide uniform heating of the filter cake within the chambers in the filter press, and also by the desire to avoid arcing between the electrodes 630 and any parts of the filter press. The electrodes 630 may conveniently be attached to the frame rails 330, although other means of fixing the electrodes in place are clearly available, such as providing a dedicated frame specifically for mounting the electrodes. Furthermore, the shape of the electrodes may be varied as required to improve the uniformity of energy deposition in the filter cake in the filter press, and also as required to reduce electrical discharge—by rounding the corners of the electrodes, for example.

FIG. 11 is a section along N-N in FIG. 10. The frame rails 330 and electrodes 630 are shown in cross-section; however, for purposes of clear illustration of certain features, the filter plate 620 is shown in plan view. The configuration of the frame rails 330 and electrodes 630 relative to the filter plate 620 is clearly shown.

Figure 12:
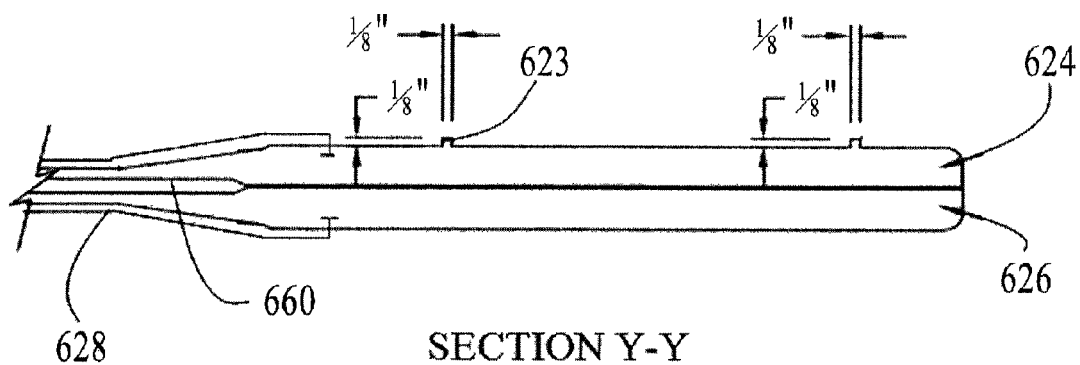
FIG. 12 is a cross-section of the filter plate of FIG. 11 showing detail of the sealing flanges, according to some embodiments of the present invention.

FIGS. 11 and 12 show compression rings/flanges 623 that are used to form a seal between adjacent filter plates. Each of the filter plates has a flange on a first side (upper part 624) and a flat surface on the second side (lower part 626). The flange has a rectangular cross-section, as shown. When the flange of a first plate is brought into contact with the flat surface of an adjacent second plate and pressure is applied, a seal is formed between the first and second plates. The flanges 623 are also seen to provide isolation for the different ports around the periphery of the filter plate, thus ensuring that vacuum ports are isolated from feed ports, for example. (See also FIG. 9.)

FIG. 11 also shows the position of the filter cloth 628 in the central area of the filter plate 620. Note that a clamp 629 is used to fix the edge of the filter cloth at the bottom of delivery slot 641, which ensures that the mixture is directed into the filter cloth lined chamber formed between adjacent filter plates. (See also FIG. 9 and related discussion.) Furthermore, FIG. 12 shows filter cloths 628 on both sides of the filter plate 620. (FIG. 13 shows in more detail how the filter cloth is attached to the filter plate.)

FIG. 13 shows a cross-sectional representation of the upper part 624 of filter plate 620. (See also FIG. 11.) The section is through a compressed air/vacuum port 646 and shows how the port 646 communicates with the chamber in between filter plates through machined hole 654. Hole 654 may have a circular cross-section in a plane orthogonal to the plane of the section. Hole 654 allows air to be forced through the filter cake or allows filtrate to be vacuumed out of the filtrate. Although not shown, those skilled in the art will appreciate, after reading the present disclosure, that a similar configuration may exist at the ports 642 and 644 for allowing steam or compressed air to inflate the envelope 660. (See FIGS. 9 & 12.)

The filter cake is positioned in a chamber in between filter plates, where the chamber is lined with filter cloths 628. The section in FIG. 13 shows the filter cloth 628 at the edge of the chamber and shows how the cloth is kept in position using a vinyl strap 1301 seated in a "T" shaped slot machined in the filter plate. The vinyl strap 1301 may be stitched into the edge of the filter cloth 628. The section also shows features 650 with channels 652 between on the surface of the diaphragm part of the filter plate. (See also FIGS. 3A-3D.) The channels are arranged so as to allow any filtrate which is squeezed or vacuumed through the filter cloth 628 to pass to hole 654 and to vacuum port 646. The filter plate is similarly configured at each vacuum port 646. (See FIG. 9 for position of ports.)

The frame rails and other structural components of the filter press may be formed of carbon fiber and other nonmetallic materials, as required to use radio frequency heating. The stack of filter plates may be surrounded by a radio frequency screening material, so as to reduce radio frequency radiation outside of the filter press, if needed.

Dewatering using the present invention is capable of producing dried filter cake containing less than 10% water by weight, and even less than 1% water by weight.

In general, microwave frequencies may be well suited for small filter presses and the lower frequencies may be well suited for large filter presses. This is due to the lower frequencies being more penetrating within the filter press. In general, small filter presses are used for high value products such as foodstuffs and pharmaceuticals, for example, and large filter presses are used for high volume processes. The use of radio frequency has a further advantage in that it is effective in destroying biological growths, pathogens and viruses.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A filter press system for separating a mixture of liquid and insoluble solids, said filter press system comprising:
   a frame comprising two parallel horizontal rails attached to a vertical end plate; and
   a plurality of filter plates configured to form a stack of parallel plates, each of said plurality of filter plates being movably attached to said frame, each of said plurality of filter plates hanging on said horizontal rails wherein the plane of each of said plurality of filter plates is parallel to said vertical end plate, said plurality of filter plates further being configured to form a multiplicity of chambers, each of said multiplicity of chambers being formed by adjacent filter plates of said plurality of filter plates, each of said multiplicity of chambers being lined by filter cloths, wherein said plurality of filter plates, said multiplicity of chambers and said filter cloths are configured to allow filtrate to escape from said chambers while retaining solids from said mixture to form a filter cake;
   wherein each of said plurality of filter plates comprises at least one side feed port and at least one delivery slot, said at least one side feed port being an aperture completely through the filter plate, said at least one delivery slot being a slot in the filter plate with a first end and a second end, each of said at least one delivery slots being connected to a corresponding one of said at least one side feed ports at said first end and to a corresponding one of said multiplicity of chambers at said second end, and wherein the second end is higher in the vertical plane than said aperture.

2. The filter press system as in claim 1, further comprising a clamp at said second end of said at least one delivery slot for securing the edge of a corresponding one of said filter cloths to the filter plate.

3. The filter press system as in claim 1, wherein said plurality of filter plates is made of plastics.

4. The filter press system as in claim 1, wherein said frame is nonmetallic.

5. A method of separating a mixture of liquid and insoluble solids in a filter press including a plurality of filter plates, said method comprising:
   pumping said mixture into a multiplicity of chambers to form a filter cake, each of said multiplicity of chambers being between adjacent filter plates of said plurality of filter plates, each of said multiplicity of chambers being lined by filter cloths, wherein, during said pumping, filtrate is forced through said filter cloths and out of said multiplicity of chambers; and
   releasing dried filter cake from said multiplicity of chambers;
   wherein said pumping comprises pumping said mixture through a multiplicity of side feed ports and into each of said multiplicity of chambers through a multiplicity of delivery slots, and wherein the openings of said multiplicity of delivery slots into each of said multiplicity of chambers is above the height of said multiplicity of side feed ports.

6. The method as in claim 5, wherein said filter press comprises:
   a frame comprising two parallel horizontal rails attached to a vertical end plate; and
   said plurality of filter plates configured to form a stack of parallel plates, each of said plurality of filter plates being movably attached to said frame, each of said plurality of filter plates hanging on said horizontal rails wherein the plane of each of said plurality of filter plates is parallel to said vertical end plate;

wherein each of said plurality of filter plates comprises at least one side feed port and at least one delivery slot, said at least one side feed port being an aperture completely through the filter plate, said at least one delivery slot being a slot in the filter plate with a first end and a second end, each of said at least one delivery slots being connected to a corresponding one of said at least one side feed ports at said first end and to a corresponding one of said multiplicity of chambers at said second end, and wherein the second end is higher in the vertical plane than said aperture.

7. The method as in claim 5, further comprising heating said filter cake in said multiplicity of chambers, wherein, during said heating, filtrate is forced through said filter cloths and out of said multiplicity of chambers.

8. The method as in claim 7, further comprising, during said heating, vacuum pumping said multiplicity of chambers.

9. The method as in claim 7, wherein said filtrate forced through said filter cloths and out of said multiplicity of chambers during said heating includes filtrate vapor.

10. The method as in claim 5, further comprising squeezing said filter cake in said multiplicity of chambers.

11. The method as in claim 10, wherein each of said plurality of filter plates includes an envelope, said envelope being inflatable by a fluid, and wherein said squeezing includes inflating said envelopes with said fluid.

12. The method as in claim 11, wherein said fluid is steam.

13. The method as in claim 11, wherein said fluid is compressed air.

* * * * *